United States Patent
Laaksonen et al.

(10) Patent No.: US 12,170,578 B2
(45) Date of Patent: Dec. 17, 2024

(54) AUDIO IN AUDIO-VISUAL CONFERENCING SERVICE CALLS

(71) Applicant: Nokia Technologies Oy, Espoo (FI)

(72) Inventors: Lasse Juhani Laaksonen, Tampere (FI); Arto Juhani Lehtiniemi, Tampere (FI); Mikko Olavi Heikkinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/351,969

(22) Filed: Jul. 13, 2023

(65) Prior Publication Data
US 2024/0056328 A1   Feb. 15, 2024

(30) Foreign Application Priority Data
Aug. 10, 2022  (EP) .................................... 22189697

(51) Int. Cl.
    *H04L 12/18* (2006.01)
(52) U.S. Cl.
    CPC .............................. *H04L 12/1822* (2013.01)
(58) Field of Classification Search
    None
    See application file for complete search history.

(56) References Cited

U.S. PATENT DOCUMENTS

| | | | | |
|---|---|---|---|---|
| 10,680,995 B1* | 6/2020 | Hinkle | ................ | H04L 12/1813 |
| 2002/0154210 A1* | 10/2002 | Ludwig | ................ | H04M 3/562 |
| | | | | 348/E7.083 |
| 2005/0129252 A1* | 6/2005 | Heintzman | ............ | H04R 29/00 |
| | | | | 381/58 |
| 2008/0074488 A1* | 3/2008 | Thompson | ............. | H04N 7/147 |
| | | | | 348/14.08 |
| 2011/0066941 A1* | 3/2011 | Chipchase | .............. | G06F 3/165 |
| | | | | 726/27 |
| 2011/0087552 A1* | 4/2011 | Carver | ................... | G06Q 30/02 |
| | | | | 705/14.72 |

(Continued)

FOREIGN PATENT DOCUMENTS

| | | | | |
|---|---|---|---|---|
| EP | 2881946 A1 | 6/2015 | | |
| WO | WO-2022067099 A2 * | 3/2022 | ........... | G06F 3/0482 |

OTHER PUBLICATIONS

Extended European Search Report received for corresponding European Patent Application No. 22189697.0, dated Dec. 15, 2022, 6 pages.

*Primary Examiner* — Phyllis A Book
(74) *Attorney, Agent, or Firm* — McCarter & English LLP

(57) ABSTRACT

To optimize audio quality of playback with other audio in calls established using an audio-visual conferencing service, at least two audio profiles for one or more audio playback devices connectable to the apparatus are maintained for the audio-visual conferencing service. The at least two audio profiles comprise a first audio profile for at least transmitting audio of a first quality for playback and a second audio profile for at least transmitting audio of a second quality for playback. It is allowed to change an active audio profile during a call established using the audio-visual conferencing service by switching the active audio profile between at least the first audio profile and the second audio profile. The received audio in the call is delivered to the audio playback device according to the active audio profile.

20 Claims, 5 Drawing Sheets

(56) References Cited

U.S. PATENT DOCUMENTS

| | | | | |
|---|---|---|---|---|
| 2013/0027508 A1* | 1/2013 | Charish | ............... | H04M 7/123 |
| | | | | 348/E7.083 |
| 2020/0097248 A1* | 3/2020 | Wood | ..................... | H04S 7/302 |
| 2020/0174738 A1* | 6/2020 | Pratt | ..................... | G06F 3/165 |
| 2020/0382866 A1* | 12/2020 | Felton | ..................... | G06F 9/542 |
| 2021/0144332 A1* | 5/2021 | Pollack | ............... | G11B 27/034 |
| 2021/0334068 A1* | 10/2021 | Rangaraju | ........... | G06F 3/04817 |
| 2021/0373843 A1* | 12/2021 | Hornsby | ............... | G06F 3/165 |
| 2022/0019403 A1* | 1/2022 | Carrigan | ............ | G06F 3/04842 |
| 2022/0070010 A1* | 3/2022 | Frolovichev | .......... | H04N 7/147 |
| 2022/0293135 A1* | 9/2022 | Smith | ............ | H04N 21/41407 |

* cited by examiner

AUDIO IN AUDIO-VISUAL CONFERENCING SERVICE CALLS

TECHNICAL FIELD

Various example embodiments relate to audio-visual conferencing services.

BACKGROUND

Communication systems are under constant development, as well as services provided via communication systems. One example is different audio-visual conferencing services which have become increasingly widespread. A user experience during an audio-visual call, established using an audio-visual conferencing service, depends on quality of information being transmitted between sites of the call, and quality delivered, or deliverable, by devices at the sites.

SUMMARY

The independent claims define the scope.

It is disclosed herein as an example implementation of an apparatus, an apparatus comprising means for: maintaining, for an audio-visual conferencing service, at least two audio profiles for one or more audio playback devices connectable to the apparatus, the at least two audio profiles comprising a first audio profile for at least transmitting audio of a first quality for playback and a second audio profile for at least transmitting audio of a second quality for playback; allowing changing of an active audio profile during a call established using the audio-visual conferencing service by switching the active audio profile between at least the first audio profile and the second audio profile; and delivering received audio in the call to an audio playback device connected to the apparatus according to the active audio profile.

In a further example implementation of the apparatus, wherein the first audio profile is associated with a first content type and the second audio profile is associated with a second content type, the means are further configured to perform: determining content type of received content in the call; switching, upon detecting that the content type in the call is not associated with the active audio profile, the active audio profile.

In a further example implementation of the apparatus, wherein the first audio profile is associated with a first content type and the second audio profile is associated with a second content type, the means are further configured to perform: receiving information on upcoming content type in the call; detecting, from the information that the content type associated with the active audio profile is different than an upcoming content type; defining, using the information, a switch point in the call for changing the active audio profile to be an audio profile associated with the upcoming content type; and switching at the switch point the active audio profile.

In a further example implementation of the apparatus, the means are further configured to perform: receiving information on an upcoming content type change point in the call; and switching at the content type change point the active audio profile.

In a further example implementation of the apparatus, the means are further configured to perform: associating at least the first audio profile with a first visualization mode and the second audio profile with a second visualization mode, wherein the first visualization mode and the second visualization mode are visualization modes of the audio-visual conferencing service; using a visualization mode associated with the active audio profile; and switching the visualization mode when the active audio profile is switched.

In a further example implementation of the apparatus, the means are further configured to perform: associating at least the first audio profile with a first visualization mode and the second audio profile with a second visualization mode, wherein the first visualization mode and the second visualization mode are visualization modes of the audio-visual conferencing service; prompting, when switching the active audio profile from an audio profile with which a visualization mode associated with the audio profile is used, a user of the apparatus to provide a permission to switch the visualization mode; and switching, in response to a user input providing the permission, the visualization mode.

In a further example implementation of the apparatus, the means are further configured to perform: receiving a user input selecting a visualization mode; and using the visualization mode selected regardless of a visualization mode associated with the active audio profile.

In a further example implementation of the apparatus, the means are further configured to perform: switching, in response to receiving in the call one of a user input to change the active audio profile and a user input triggering the change, the active audio profile according to the user input.

In a further example implementation of the apparatus, the first audio profile is for bi-directional transmission of audio providing mono playback and the second audio profile for unidirectional audio providing stereo playback.

In a further example implementation of the apparatus, wherein the first audio profile is for bi-directional transmission of audio providing mono playback and the second audio profile for unidirectional audio providing stereo playback, the means are further configured to perform: in response to receiving a user input to mute the user when the first audio profile is the active audio profile, switching the active audio profile to be the second audio profile; in response to receiving a user input to unmute the user when the second audio profile is the active audio profile, switching the active audio profile to be the first audio profile while maintaining the user muted; and in response to receiving a user input to unmute the user when the first audio profile is the active audio profile, unmuting the user.

In a further example implementation of the apparatus, the means are further configured to perform: indicating a status of the user to be deep muted when the active audio profile is the second audio profile, muted when the active audio profile is the first audio profile and the user is muted, or unmuted when the active audio profile is the first audio profile and the user is unmuted; and transmitting to other participants of the call the status of the user.

In a further example implementation of the apparatus, the means are further configured to perform: using, for transmitting audio to other participants in the call, one of a first microphone in the audio playback device and at least one second microphone the apparatus comprises or is connected to; associating at least the first audio profile with the use of the first microphone and the second audio profile with the use of the at least one second microphone; switching, in response to starting to use the first microphone, the active audio profile to be the first audio profile; and switching, in response to starting to use one of the at least one second microphone, the active audio profile to be the second audio profile.

In a further example implementation of the apparatus, the means are further configured to perform: determining, while a user is talking, whether to use the first microphone or the one of the at least one second microphone based on at least one of a distance between the apparatus and the audio playback device, and signal strength difference between microphones; and in response to the determining resulting switching to use the first microphone, performing switching of the active audio profile, and when the active audio profile switching is completed, switching to the first microphone.

It is disclosed herein as an example implementation, a method comprising: maintaining, for an audio-visual conferencing service, at least two audio profiles for one or more audio playback devices, the at least two audio profiles comprising a first audio profile for at least transmitting audio of a first quality for playback and a second audio profile for at least transmitting audio of a second quality for playback; allowing changing of an active audio profile during a call established using the audio-visual conferencing service by switching the active audio profile between at least the first audio profile and the second audio profile; and delivering received audio in the call to an audio playback device according to the active audio profile.

It is disclosed herein as an example implementation, a computer program comprising instructions which, when the program is executed by a computer, cause the computer to carry out: maintaining, for an audio-visual conferencing service, at least two audio profiles for one or more audio playback devices connectable to the apparatus, the at least two audio profiles comprising a first audio profile for at least transmitting audio of a first quality for playback and a second audio profile for at least transmitting audio of a second quality for playback; allowing changing of an active audio profile during a call established using the audio-visual conferencing service by switching the active audio profile between at least the first audio profile and the second audio profile; and delivering received audio in the call to an audio playback device connected to the apparatus according to the active audio profile.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first audio profile could be termed a second audio profile, and similarly, a second audio profile could be also termed a first audio profile without departing from the scope of the present disclosure.

Figure 1:
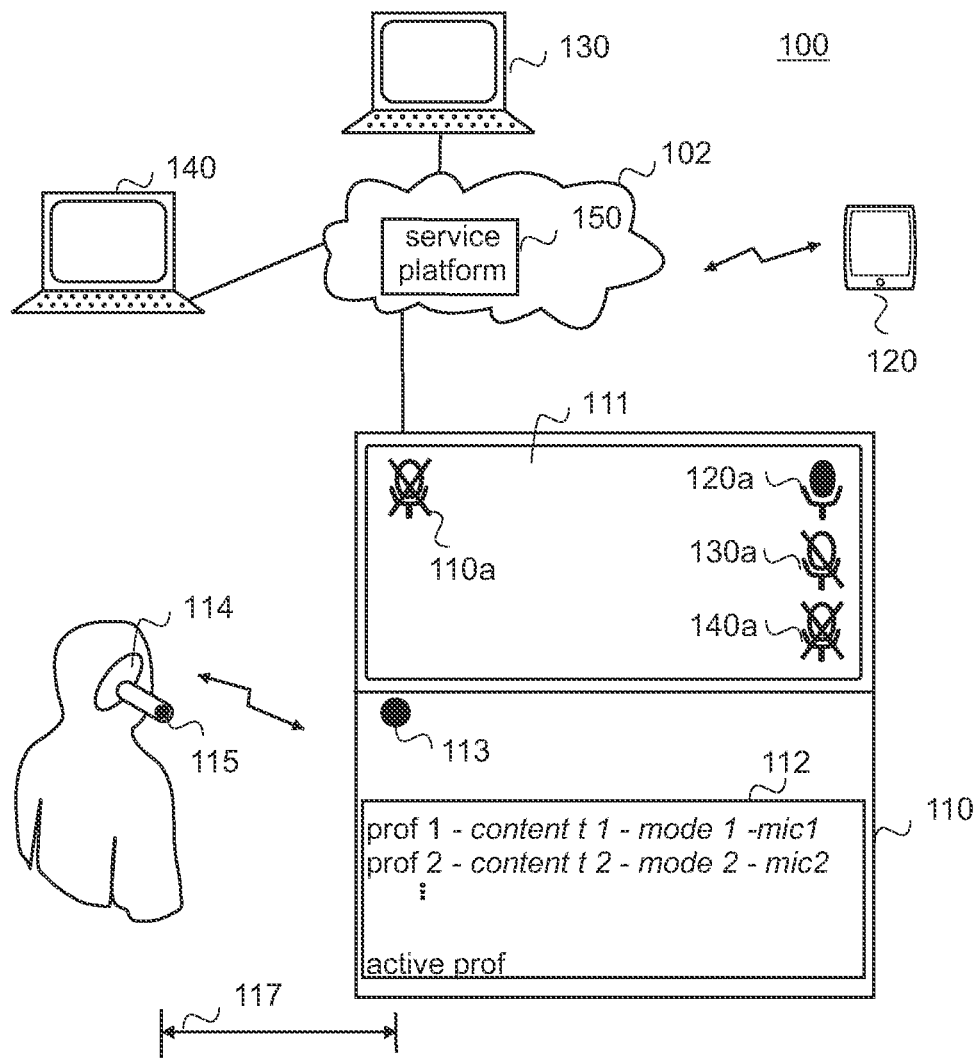
FIG. 1 illustrates an exemplified wireless communication system.

FIG. 1 depicts an example of a simplified system architecture only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. Further, embodiments are not, however, restricted to the system 100 given as an example but a person skilled in the art may apply the solution to other systems provided with necessary properties.

The example illustrated in FIG. 1 relates to a call established using an audio-visual conferencing service. In the illustrated example, participants have connected to the call by means of four apparatuses, 110, 120, 130, 140. It should be appreciated that there may be any number of apparatuses connected to a call (real time online meeting) established using an audio-visual conferencing service via one or more communication networks 102. The audio-visual conferencing service may be provided by a service platform 150, and the participants may have installed to their apparatuses 110, 120, 130, 140 a corresponding audio-visual conferencing client (application), or they may use a corresponding web browser, to participate to the call. A non-limiting list of audio-visual conferencing services include Microsoft Teams, Zoom Meetings, Webex, Bluejeans and Google Hangouts. The audio-visual conferencing services allow, in addition to sharing audio-visual content of participants, other content sharing, for example screen sharing, chatting via text, exchanging files, broadcasting conferences to large groups of passive viewers, like webinars, over the one or more communication networks 102. The one or more communication networks 102 may include wireless networks, like wireless local area network, cellular communications networks, like 4G, 5G, 6G, etc., and wired networks, including Internet. It is obvious for a person skilled in the art that the embodiments and examples described herein may be applied to any kind of audio-visual conferencing service, using any kind of communication networks, and hence they do not need to be described in more detail herein.

The apparatus 110 typically refers to a computing device that includes wired communication devices and wireless mobile (portable) communication devices operating with or without a subscriber identification module (SIM), including, but not limited to, the following types of devices: a smartphone 120, laptop 130 and/or touch screen computer 140, tablet, game console, notebook, desktop computer, and multimedia device. In some applications, an apparatus may comprise a user portable device with radio parts (such as a watch, earphones, eyeglasses, other wearable accessories or wearables) and the computation is carried out in a cloud. The apparatus 110 may also be called a subscriber unit, mobile station, remote terminal, access terminal, user device, user terminal or user equipment, just to mention few names of apparatuses.

In the illustrated example of FIG. 1, a more detailed schematic view of equipment used by one participant is illustrated, the equipment comprising the apparatus 110 and an external audio playback device 114 connected to the apparatus. Naturally, the equipment may comprise other devices, for example a webcam, not illustrated herein.

The audio playback device 114 is connectable to the apparatus 110 wirelessly, as in the example illustrated in FIG. 1, or via a wired connection. Any type of connection may be used. The audio playback device may be a headset or earbuds. Further, in the illustrated example the audio playback device comprises a microphone 115 for audio input. However, it should be appreciated that a participant can use an audio playback device that does not comprise a microphone. The audio playback device 114 is configured to provide at least audio of a first quality and audio of a second quality. For example, the audio of the first quality may provide mono playback allowing bi-directional audio transmission, i.e. audio to and from the audio playback device 114, and the audio of the second quality may provide stereo playback allowing unidirectional audio transmission, i.e. audio to the audio playback device 114.

The apparatus 110 comprises, and/or is connectable to, at least one screen 111 for visual content, and in the illustrated example, the apparatus 110 comprises one or more microphones 113. It should be appreciated that there may be apparatuses without a microphone and/or the apparatus may be connectable to one or more external microphones, other than the one possibly in the audio playback device 114. Usually, one microphone at a time is used for capturing voice and transmitting the voice as audio to other participants in the call.

In the illustrated example of FIG. 1, the apparatus 110 is configured to switch at least between two different audio profiles, as will be described in more detail below with FIGS. 2 to 12. Therefore, in the illustrated example, the apparatus 110 is configured to maintain in its memory 112 at least two audio profiles, depicted in FIG. 1 by prof 1 and prof 2, for one or more audio playback devices. Further, in the illustrated example of FIG. 1, the audio profile configurations (settings) maintained in the memory 112 associate the audio profiles, per an audio profile, with a content type, or a content type of received data, depicted by content t 1 and content t 2, with a visualization mode, depicted by mode 1 and mode 1, and with a microphone, depicted by mid and mic2. Further, the apparatus may be configured to maintain in the memory 112 information, which one of the audio profiles is an active audio profile, i.e. an audio profile currently in use.

The audio profiles for one or more audio playback devices 114 connectable to the apparatus provide different audio quality for playback of received audio. For example, one or more of the at least two audio profiles may be communications-suitable profiles, and one or more of the at least two audio profiles may be audio-distribution suitable profiles. A communications-suitable profile allows bidirectional audio with a low delay. The low delay may be different between different communications-suitable profiles, for example one of them may provide a low delay supporting conversations between persons participating via apparatuses to the call. Low delay, or differences between low delays, may be due to low delay of coding algorithm, and/or low delay of packet transmission, and/or low delay of rendering, or corresponding requirement. The communications-suitable profile may have constraints, for example a number of channels may be low (minimum mono up, mono down), and/or audio coding may use low bit rate or otherwise result in lower perceptual quality. An audio-distribution suitable profile may be limited to unidirectional audio. The audio-distribution suitable profile may have an optimized audio quality for unidirectional audio with relaxed algorithmic delay requirement or higher bit rate for audio coding, compared to the communications-suitable profile(s). The audio-distribution suitable profile may have a higher number of channels than the communications-suitable profile(s) for example, the audio-distribution suitable profile can have at least two channels. In some examples, the at least one communications-suitable profile and the at least one audio-distribution suitable profile may support the two audio channels, where the former can utilize them in bidirectional mono configuration and the latter can utilize them in unidirectional stereo configuration. In the examples below it is assumed, for the sake of clarity of the description, that there are two audio profiles, the first one providing mono quality of audio, associated with received content type "anything else but not video" and the second one providing stereo quality of audio, associated with received content type "video". It should be appreciated that herein content means shared content, not including voice from a talking participant or video captured of a participant. For example, the first audio profile may correspond to a synchronous connection oriented mode or enhanced synchronous connection oriented mode, and the second audio profile may correspond to an asynchronous connection less mode.

The active audio profile, i.e. the audio profile currently in use, at least for received content, is determined based on content type of the received content, using the association, unless overruled by a user input, for example the user starting to talk or share content, or providing corresponding indication of intention to talk/share content, or by a microphone related functionality, if such functionality is implemented and activated to be in use in the apparatus 110. The microphone related functionality is described below with FIGS. 11 and 12, and it may be partly based on a distance 117 between the microphone 115 in the audio playback device and the microphone 113 comprised in or connected to the apparatus 110. It should be appreciated that at most one audio profile may be active at a time.

A non-limiting examples of visualization modes include a non-full screen mode allowing splitting the display area to smaller portions, for example for chat, for participant information, etc., and a full screen mode for content. The associated visualization content, if implemented and activated to be in use in the apparatus 110, may be a preferable visualization mode, which may be overridden by a user input.

In the illustrated example, the audio-visual conferencing service is configured to indicate and transmit information on output audio status, or shortly status, of participants to other parties, or more precisely to other parties' apparatuses. In the illustrated example of FIG. 1, in the apparatus 110, the user's own status 110a is shown to be deep muted. The status 140a of user(s) of the apparatus 140 is also deep muted, whereas the status 130a of user(s) of the apparatus 130 is muted; and the status 120a of a user of the apparatus 120 is unmuted. For example, the status may be indicated to be deep muted when an active audio profile is the second audio profile (stereo), the status may be muted when the active audio profile is the first audio profile (mono) and the user is muted, or the status may be unmuted when the active audio profile is the first audio profile (mono) and the user is unmuted. It should be appreciated that other ways than the one illustrated in FIG. 1, may be used to indicate the output audio status of a user. For example, text string "deep" displayed under mute indication, or a displayed picture of a disconnected cable, may indicate the status to be deep muted.

FIGS. 2 to 12 illustrate examples of possible functionalities when an audio-visual conferencing service call has been established and is going on. The details how an audio-visual call is established bears no significance and hence are not described in more detail herein. Further, the different functionalities may be combined, depending on capabilities of used apparatuses, and/or used audio-visual conferencing service.

Figure 2:
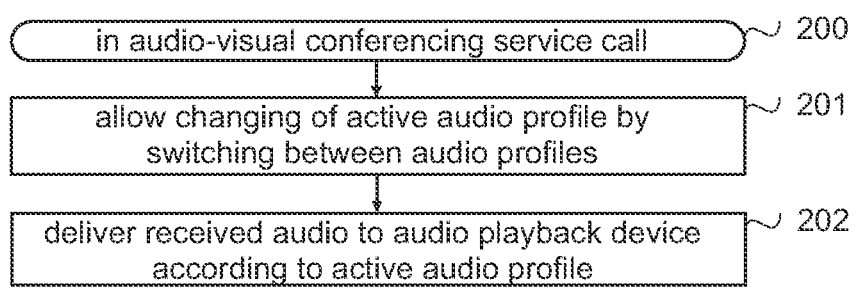
FIGS. 2 to 12 are flow charts illustrating example functionalities.

Referring to FIG. 2, in the audio-visual conferencing service call (block 200), changing of an active audio profile by switching the active audio profile between at least the first audio profile and the second audio profile is allowed (block 201) and received audio in the call is delivered (block 202), for example transmitted over a wireless connection, to an audio playback device connected to the apparatus, according to the active audio profile, resulting that the audio playback device playbacks the audio according to the active audio profile.

Figure 3:
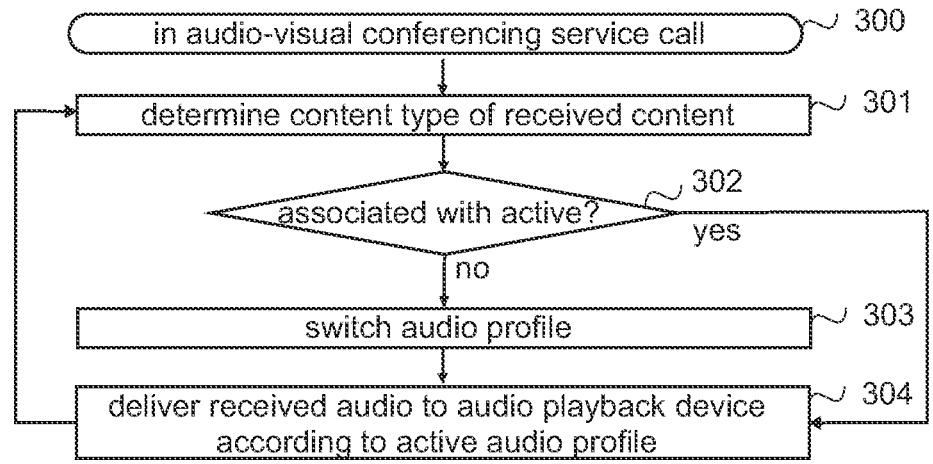
Figure 4:
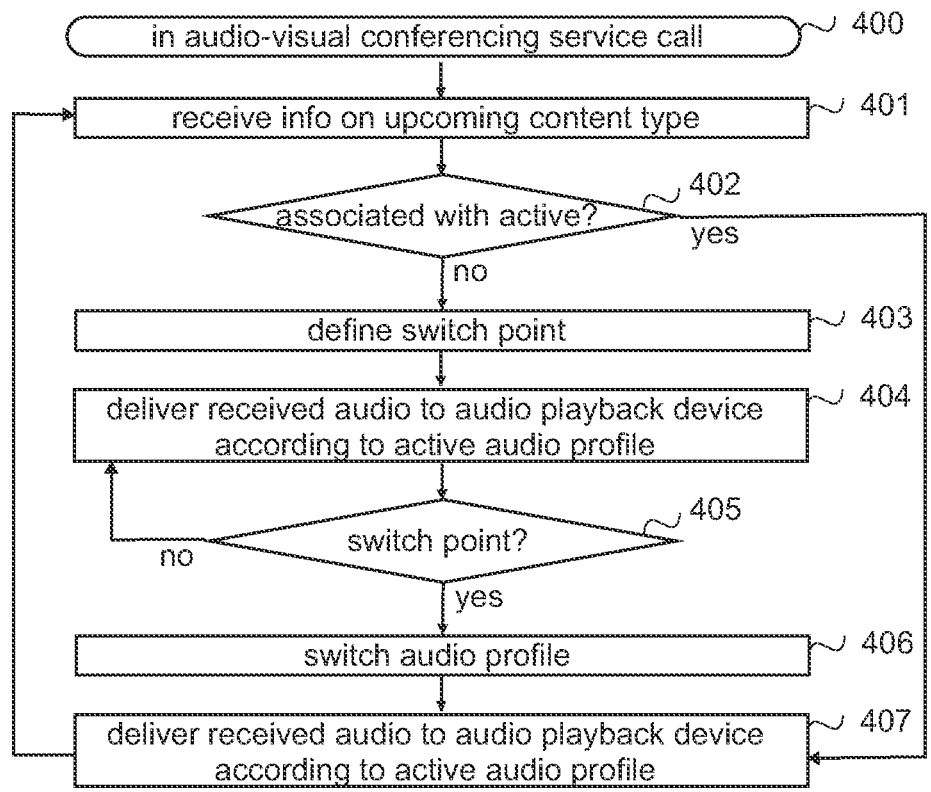
Figure 5:
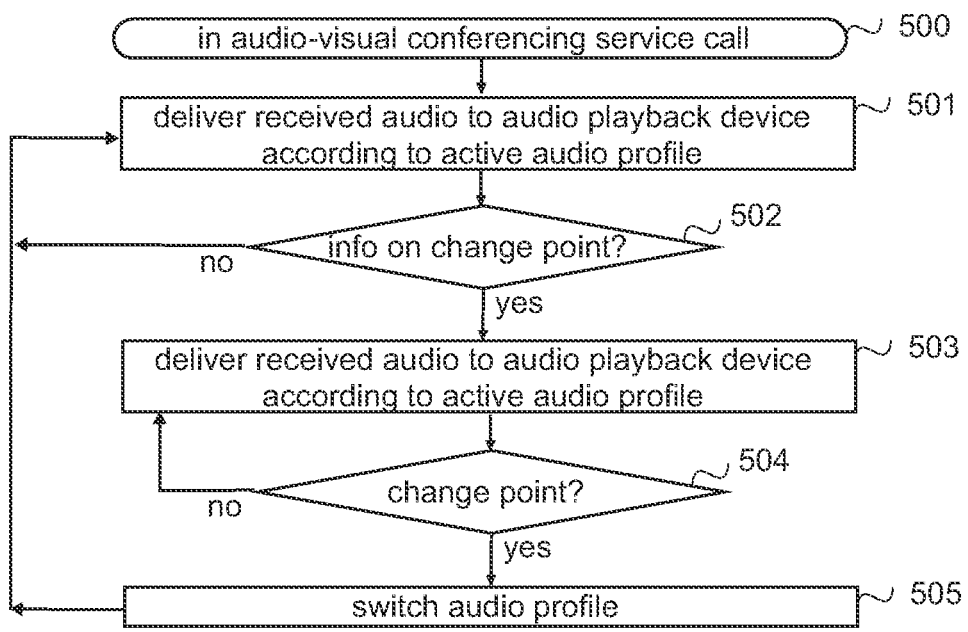

FIGS. 3 to 5 illustrate different examples relating to automatic switching of audio profiles, i.e. switching without specific user input, especially when the user is not a content originator (a presenter) but a content receiver. Depending on an implementation, an apparatus may be configured to apply functionality of FIG. 3, or functionality of FIG. 4, or functionality of FIG. 5, or functionality of FIGS. 3 and 4, or functionality of FIGS. 4 and 5, or functionality of FIGS. 3 and 5, or functionality of FIGS. 3, 4 and 5.

Referring to FIG. 3, in the audio-visual conferencing service call (block 300), content type of received content in the call is determined (block 301), and it is checked (block 302), whether the content type is the one that is associated with the audio profile that is currently the active audio profile. Upon detecting that the content type in the call is not associated with the active audio profile (block 302: no), the active audio profile is switched (block 303), and then received audio in the call is delivered (block 304), for example transmitted over a wireless connection, to an audio playback device connected to the apparatus according to the active audio profile. Meanwhile the process continues in block 301 by determining the content type.

If the content type in the call is associated with the active audio profile (block 302: yes), the received audio in the call is delivered (block 304), for example transmitted over a wireless connection, to the audio playback device connected to the apparatus according to the active audio profile (without switching it). Meanwhile the process continues in block 301 by determining the content type.

For example, when the incoming stream is non-video, the first audio profile is in use with mono audio, but when the incoming stream changes to video, the active audio profile is automatically changed to be the second audio profile with stereo audio, and as long as the incoming stream is video, the active audio profile remains the second audio profile, but when the video stream ends, the active audio profile is automatically changed to be the first audio profile with mono audio.

However, switching audio profiles may cause some delay or break, for example few seconds of the audio in the video may be delivered in mono. FIGS. 4 and 5 describe different examples how the switching of audio profiles may be performed in a predictive way which minimizes, or even avoids, delays or breaks in the received audio, at least at unwanted times.

In some implementations, the application (client) in the apparatuses is configured to monitor, at least while a user is sharing content, for example while giving a presentation, for example a slideshow, in the call, content type of upcoming content, and forward that information also to other participants' apparatuses (via the service platform), and the application (client), as a receiving participant, may be configured to process that information, for example according to the example functionality of FIG. 4. For example, the upcoming content in the presentation may include a slide 1 having text, a slide 2 having text and figures and a slide 3 having a video with stereo audio.

Referring to FIG. 4, in the audio-visual conferencing service call (block 400), information on upcoming content type in the call is received (block 401) and it is checked (block 402), whether the content type is the one that is associated with the audio profile that is currently the active audio profile. Upon detecting (block 402: no), from the information, that the content type associated with the active audio profile is different than an upcoming content type, a switch point in the call for changing the active audio profile to be an audio profile associated with the upcoming content type is defined (block 403) using the information. For example, the switch point may be the point when the slide 2 is switched to the slide 3 in another apparatus. The received audio in the call is delivered (block 404), for example transmitted over a wireless connection, to the audio playback device connected to the apparatus according to the active audio profile until (block 405) the switch point is arrived. The active audio profile is switched (block 406) at the switch point and then received audio in the call is delivered (block 407) to the audio playback device according to the active audio profile. Meanwhile the process continues in block 401 by receiving information on the upcoming content type. Hence, mono audio according to the first audio profile is delivered as long as slides 1 and 2 are presented, but when the presentation proceeds to the slide 3, the audio profiles are switched, and stereo audio according to the second audio profile is delivered.

If the content type in the call is associated with the active audio profile (block 402: yes), the received audio in the call is delivered (block 407), for example transmitted over a wireless connection, to the audio playback device connected to the apparatus according to the active audio profile (without switching it). Meanwhile the process continues in block 401 by receiving information on the upcoming content type.

In some implementation, the application (client) in the apparatuses is configured to monitor, at least while a user is sharing content, for example while giving a presentation, for example a slideshow, in the call, content type of upcoming content, and either determine an upcoming content change point and forward information on the change point also to other participants' apparatuses, or forward information on the upcoming content to the service platform, which is configured to determine the upcoming content change point, and forward information on the change point to other participants' apparatuses, and the application (client), as a receiving participant, may be configured to process that information, for example according to the example functionality of FIG. 5. For example, the upcoming content in the presentation may include a slide 1 having text, a slide 2 having text and figures and a slide 3 having a video with stereo audio, and the upcoming content change point will be the point be the point when the slide 2 is switched to the slide 3.

Referring to FIG. 5, in the audio-visual conferencing service call (block 500), received audio in the call is delivered (block 501) to the audio playback device according to the active audio profile, as described above, until (block 502) information on an upcoming content type change point in the call is received. For example, The received audio in the call is still delivered (block 503) to the audio playback device according to the active audio profile until (block 504) the content type change point is arrived. The active audio profile is switched (block 505) at the change point and then the process continues in block 501 to deliver the received audio in the call according to the active audio profile. Hence, mono audio according to the first audio profile is delivered as long as slides 1 and 2 are presented, but when the presentation proceeds to the slide 3, the audio profiles are switched, and stereo audio according to the second audio profile is delivered.

Figure 6:
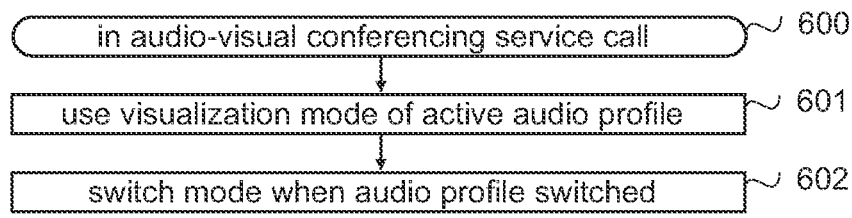
Figure 7:
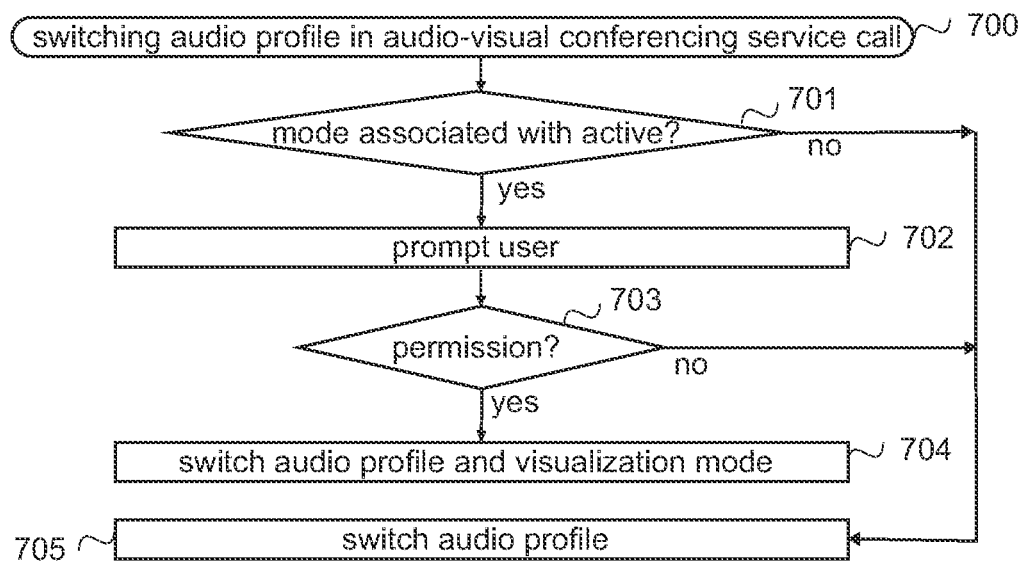
Figure 8:
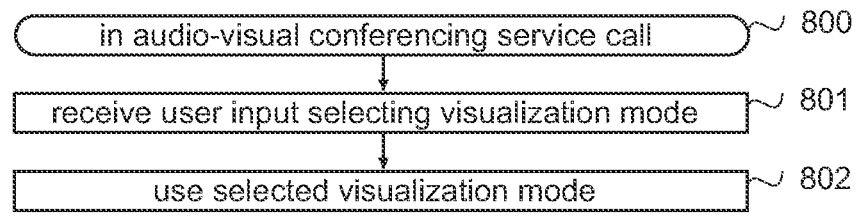

FIGS. 6 to 8 illustrate example functionalities relating to implementations in which the audio profiles are associated with corresponding visualization modes, for example the first audio profile having the mono audio with the non-full screen mode, and the second audio profile having the stereo audio with the full screen mode.

Referring to FIG. 6, in the audio-visual conferencing service call (block 600), a visualization mode associated with the active audio profile is used (block 601), and the visualization mode is switched (block 602) when the active audio profile is switched. Hence, the user can see the video automatically in full screen mode instead of looking at smaller window or having to change the visualization manually, or vice versa, after the video the user will automatically return back to the smaller window with possible additional information.

Referring to FIG. 7, when the active audio profile in the audio-visual conferencing service call (block 700) is to be switched, it is checked (block 701), whether the current visualization mode is associated with the active audio profile in use prior the switch of the active audio profile. If it is (block 701: yes), a user of the apparatus is prompted (block 702) to provide a permission to switch the visualization mode. If a user input providing the permission is received (block 703: yes), the visualization mode and the active audio profile are switched (block 704). If a user input not providing the permission is received (block 703: no), the active audio profile is switched (block 705) but the visualization mode is not switched. The separate user permission may be useful, for example, when the user is working on something else while listening, and does not wish a video to automatically take over the full screen. Depending on an implementation, if a user input is not received within a predetermined time, the "no user input" may be interpreted as a permission, or as no permission.

Referring to FIG. 8, in the audio-visual conferencing service call (block 800), when a user a user input selecting a visualization mode is received (block 801), the visualization mode selected is used (block 802) regardless of a visualization mode associated with the active audio profile. In other words, the user may freely change the visualization mode at any time.

Figure 9:
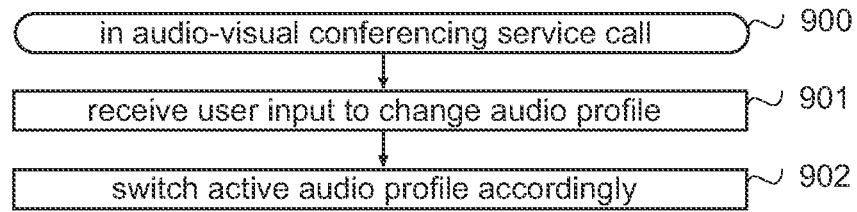

It may be also possible for the user to change the active audio profile. Referring to FIG. 9, in the audio-visual conferencing service call (block 900), when a user a user input to change the active audio profile is received (block 901), the active audio profile is switched (block 902) accordingly. However, that may also change the user's output audio status, i.e. the user's possibility to talk in the call, depending on devices available.

Figure 10:
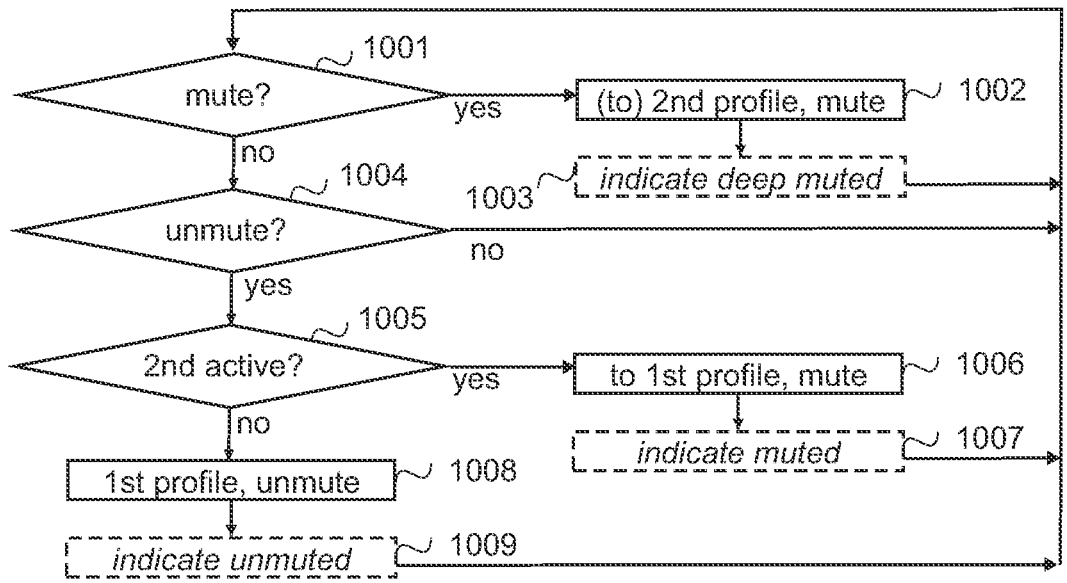

The user input to change the active audio profile for received content may be a user input triggering the change, such as setting a microphone on or off, or changing the user's output audio status, for example as described with the example functionality illustrated in FIG. 10.

In the example illustrated in FIG. 10, the tree output audio statuses described with FIG. 1 are in use. The user input may be received by a user clicking an output audio status button, or by a user tapping or long tapping a microphone, for example. Further, as said above, in the example it is assumed that the first audio profile is for bi-directional transmission of audio providing mono playback and the second audio profile for unidirectional audio providing stereo playback.

Referring to FIG. 10, in the audio-visual conferencing service call user inputs relating to the user's output audio status are monitored. More precisely, in the illustrated example it is monitored, whether a user input to mute (block 1001) or unmute (block 1004) the user is received.

In response to receiving a user input to mute (block 1001: yes) the user, when the first audio profile is the active audio profile, the active audio profile is switched (block 1002) to be the second audio profile and the user is muted. In case the second audio profile is the active audio profile, use of the second audio profile is continued and the user is muted. Then, in implementations in which the output status is indicated, the output status is indicated (block 1003) as deep muted, the indicating including transmitting corresponding information to other participant(s).

In response to receiving a user input to unmute the user (block 1004), it is checked (block 1005), whether the second audio profile is the active audio profile, and if it is (block 1005: yes), the active audio profile is switched (block 1006) to be the first audio profile while the user is maintained as muted. Then, in implementations in which the output status is indicated, the output status is indicated (block 1007) as muted, the indicating including transmitting corresponding information to other participant(s).

If, when the user input to unmute the user is received, the first audio profile is the active audio profile (block 1005: no), the first audio profile is maintained (block 1008) as the active audio profile and the user is unmuted (block 1008). Then, in implementations in which the output status is indicated, the output status is indicated (block 1009) as unmuted, the indicating including transmitting corresponding information to other participant(s).

In implementations in which the output status is indicated, the participants are more aware of what may happen, for example a participant considers to starting to talk (deep muted to muted) but then changes his/her mind (muted to deep muted). In any case, the deep muted status of a participant indicates that it takes some time before the participant can start to talk, for example to answer to a question.

It should be also noted that the deep muting provides the user a possibility to determine whether the user wants to have a stereo playback at a cost of a little longer unmute time, whereas a double muting is muting through the application (client), either in the apparatus or by some other participant, and through the hardware, for example a button controlling microphone.

It should be appreciated that there may also be a separate control (e.g. physical or software button) for selecting or deselecting the deep mute. and/or the application (client) is configured to provide a possibility to deep mute (and unmute) other participants in the call, for example in a similar way as to mute the other participants.

Figure 11:
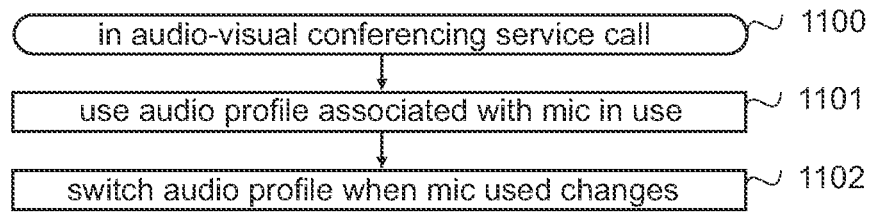
Figure 12:
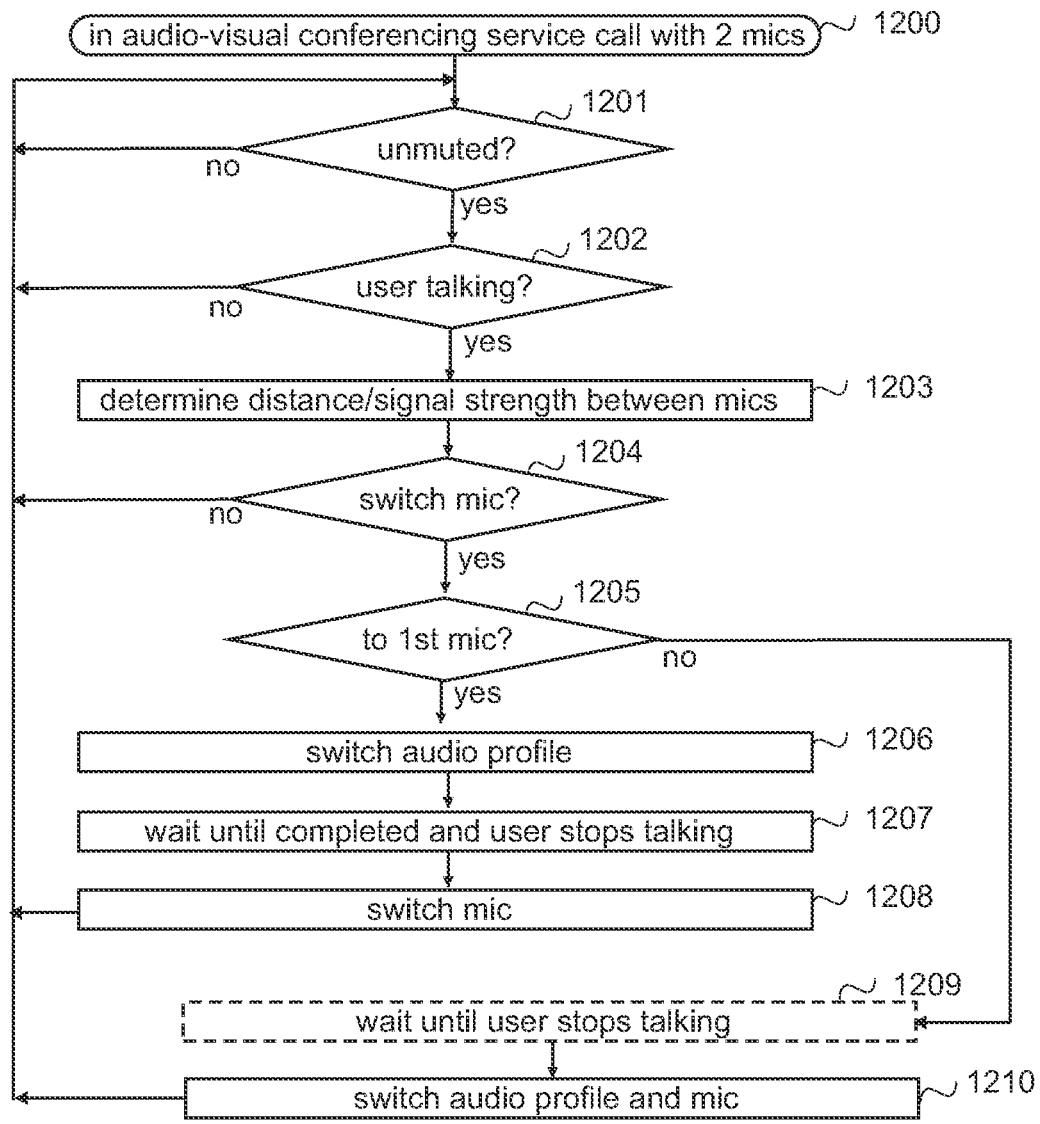

FIGS. 11 and 12 disclose example functionalities, when the audio playback device comprises a microphone and when one or more microphones that are not in the audio playback device can be used with the apparatus, and the audio profiles are associated with microphones. In the example below term "first microphone" is used for a microphone comprised in the audio playback device, and term "second microphone" is used for a microphone comprised in the apparatus, or connected to the apparatus.

Referring to FIG. 11, in the audio-visual conferencing service call (block 1100) the audio profile that is associated with a microphone currently in use is used (block 1101), and the audio profile is switched (block 1102), when the microphone used is switched. For example, when the first audio profile is associated with the use of the first microphone and the second audio profile with the use of the at least one second microphone, in response to starting to use the first microphone, the active audio profile is switched to be the first audio profile, and in response to starting to use one of the at least one second microphone, the active audio profile is switched to be the second audio profile. This enables stereo playback even when the user is unmuted (and talking) when a microphone not comprised in the audio playback device is in use. For example, the microphone in use may be determined via microphone settings and/or a second microphone may be prioritized when a second microphone is a microphone connected to the apparatus. Still a further example includes the microphone in the audio playback device is prioritized but a temporary use of the second microphone is allowed, for example by the user double clicking a mute/unmute button, so that when the user is muted (deep muted) with the stereo playback, double clicking the button causes that the second microphone will be used and the stereo playback can continue even when the user is unmuted and can talk.

FIG. 12 illustrates an example in which the apparatus is configured to automatically determine which one of the microphones (one in the audio playback device, one comprised in or connected to the apparatus), and hence the audio profiles, to use when the user is unmuted.

Referring to FIG. 12, in the audio-visual conferencing service call with two microphones (block 1200) when the user is unmuted (block 1201: yes) and the user is talking (block 1202: yes), at least one of a distance between the apparatus and the audio playback device, and a signal strength difference between microphones is determined (block 1203). The distance may be determined by determining device proximity information based on ultra-wide band or this may include visual tracking and/or audio analysis. The signal strength difference may be an input signal strength difference, and it may be compared to a threshold to determine whether the second microphone, for example, can be used. Based on the distance and/or the signal strength difference, it is determined (block 1204) whether to switch the microphone in use. In other words, it is determined, whether to use the first microphone or the second microphone and whether that results to switching the microphone. If the microphone in use is switched (block 1204: yes), it is checked (block 1205), whether the second microphone is switch to the first microphone. If the switch is to the first microphone (block 1205: yes), switching of the active audio profile is performed (block 1206), and then it is waited (block 1207) at least the time it takes to complete the switching of the active audio profile, and, in the illustrated example, if the user is talking, it is also waited (block 1207), after the audio profile switch is completed, until the user stops talking, and then the microphone is switched (block 1208) to the first microphone. By doing so, the second microphone is capturing the user's voice the whole time, to be transmitted to other participants. At the same time, the audio profile switch happens, and audio to user's ear(s) is cut momentarily. However, since the user was talking, most probably other participant have been silent and the information missed remains small (or nothing is missed). When the audio returns, it is no longer stereo in the example, but has switched to mono.

If the switch is to the second microphone (block 1205: no), in the illustrated example, if the user is talking, it is waited (block 1209) until the user stops talking, and then switching of both the microphone and the active audio profile is performed (block 1210). In another implementation, the active audio profile switching may be delayed further, until no other participant is talking, thereby ensuring that the user does not miss anything.

If the user is muted or deep muted, switching the microphone may be performed instantly, and the audio profile switching may be performed for example as described with any of FIGS. 3, 4, 5 and 8, i.e. as if there would be no association between an audio profile and a microphone.

The example implementation in FIG. 12 enables to utilize a microphone in the apparatus (or connected to the apparatus) for recording the user's voice as long as the user is close enough, thereby enabling use of the audio profile with stereo playback even when the user is unmuted. In other words, the user can listen to stereo audio over the audio playback device and use the second microphone comprised in or connected to the apparatus for his/her talk. In a further implementation, when the user moves away from the apparatus, and it becomes necessary to switch over to the microphone in the audio playback device, the apparatus may be configured to indicate via audio and/or visually that the user is about to move away from the coverage of the second microphone. The user can then remain close enough to the apparatus, or the second microphone.

One further way to control switching delay and unwanted gap in audio input, i.e. capturing the user's voice, is to temporarily increase the second microphone gain more than would be normally done (with the cost of increased amount of noise) when the user is farther away, and maintain the second microphone while the audio profile for the audio playback device is switched.

In some implementations, the apparatus may define (configure) a virtual microphone, which is being used by the audio-visual conferencing application/client. The virtual microphone may be defined to select the audio profile it uses for playback based on the availability of various microphones (including the microphone in the audio playback device microphone associated with audio profile having mono audio.)

In the above examples different solutions improving general listening-oriented audio experience in an audio-visual conferencing service call are disclosed, the examples enabling use of high quality audio playback whenever it is possible. Further, the audio profile switching may be performed automatically, thereby enabling more timely change of the audio profile.

The blocks, related functions, and information exchanges described above by means of FIGS. 1 to 12 are in no absolute chronological order, and some of them may be performed simultaneously or in an order differing from the given one. Other functions can also be executed between them or within them, and other information may be sent, and/or other rules applied. For example, when functionality described with FIG. 9 is combined with functionality described with FIG. 5, an additional check relating the active audio profile and the audio profile to which one should switch at the change point may be added, one of the results being that no switch will be performed. Another example includes to determine, for example based on user settings, such as microphone on or off, whether an automatic switching may be triggered. Some of the blocks or part of the blocks can also be left out or replaced by a corresponding block or part of the block or one or more pieces of information.

Figure 13:
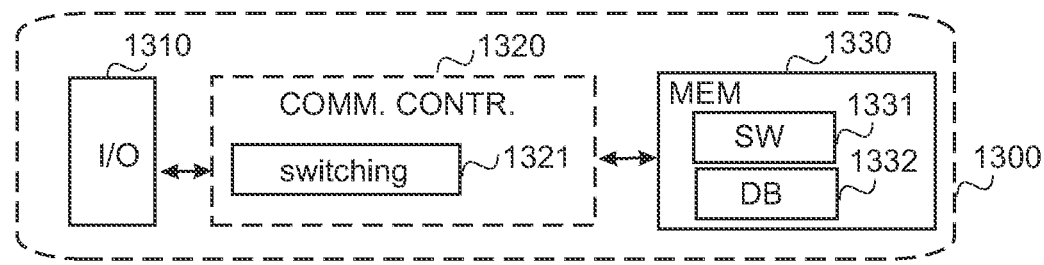
FIG. 13 is a schematic block diagram.

FIG. 13 illustrates an apparatus 1300 according to some embodiments.

The apparatus 1300 may comprise one or more communication control circuitries 1320, such as at least one processor, and at least one memory 1330, including one or more algorithms 1331, such as a computer program code (software) wherein the at least one memory and the computer program code (software) are configured, with the at least one processor, to cause the apparatus to carry out any one of the exemplified functionalities of the apparatus described above. Said at least one memory 1330 may also comprise at least one database 1332, or data storage, for example for maintaining audio profile related information at least temporarily.

Referring to FIG. 13, the one or more communication control circuitries 1320 of the apparatus 1300 comprise at least switching circuitry 1321 which is configured to perform audio profile and/or visualization mode switching according to embodiments/examples/implementations. To this end, the switching circuitry 1321 of the apparatus 1300 is configured to carry out at least some of the functionalities of the apparatus described above, e.g., by means of FIGS. 2 to 12, using one or more individual circuitries.

Referring to FIG. 13, the memory 1330 may be implemented using any suitable data storage technology, such as semiconductor based memory devices, flash memory, magnetic memory devices and systems, optical memory devices and systems, fixed memory and removable memory.

Referring to FIG. 13, the apparatus 1300 may further comprise different input/output (I/O) interfaces 1310 such as one or more communication interfaces comprising hardware and/or software for realizing communication connectivity according to one or more communication protocols. The one or more communication interfaces 1310 may enable connecting to one or more audio playback devices and provide the apparatus with communication capabilities to communicate over one or more communications networks, including cellular networks and Internet, with other participants. The one or more communication interfaces 1310 may comprise standard well-known components such as an amplifier, filter, frequency-converter, (de)modulator, and encoder/decoder circuitries, controlled by the corresponding controlling units, and one or more antennas. The different communication interfaces 1310 include also user interfaces for receiving user inputs and for outputting, e.g. displaying, received information.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware.

In an embodiment, at least some of the processes described in connection with FIGS. 2 to 12 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 12 or operations thereof.

According to an embodiment, there is provided an apparatus comprising at least one processor; and at least one memory including computer program code; the at least one memory and the computer program code being configured, with the at least one processor, to cause the apparatus at least to perform: maintaining, for an audio-visual conferencing service, at least two audio profiles for one or more audio playback devices connectable to the apparatus, the at least two audio profiles comprising a first audio profile for at least transmitting audio of a first quality for playback and a second audio profile for at least transmitting audio of a second quality for playback; allowing changing of an active audio profile during a call established using the audio-visual conferencing service by switching the active audio profile between at least the first audio profile and the second audio profile; and delivering received audio in the call to an audio playback device connected to the apparatus according to the active audio profile.

Embodiments as described may also be carried out in the form of a computer process defined by a computer program or portions thereof. Embodiments of the methods described in connection with FIGS. 2 to 12 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
    at least one processor; and
    at least one memory storing instructions that, when executed by the at least one processor, cause the apparatus at least to:
    maintain, for an audio-visual conferencing service, at least two audio profiles for one or more audio playback devices connectable to the apparatus, the at least two audio profiles comprising a first audio profile for at least transmitting audio of a first quality for playback and a second audio profile for at least transmitting audio of a second quality for playback;
    receive information on an upcoming content type in a call;
    based on a content type associated with an active audio profile of the at least two audio profiles being different than an upcoming content type, enable change of the active audio profile during the call established using the audio-visual conferencing service, comprising switching the active audio profile between at least the first audio profile and the second audio profile; and
    deliver received audio in the call to an audio playback device connected to the apparatus according to the active audio profile.

2. The apparatus of claim 1, wherein the first audio profile is associated with a first content type and the second audio profile is associated with a second content type and wherein the apparatus is further caused to: determine a content type of received content in the call; and switch the active audio profile, upon a detection that the content type in the call is not associated with the active audio profile.

3. The apparatus of claim 1, wherein the first audio profile is associated with a first content type and the second audio profile is associated with a second content type and wherein the apparatus is further caused to:
    define, using the information, a switch point in the call for changing the active audio profile to be an audio profile associated with the upcoming content type; and
    switch at the switch point the active audio profile.

4. The apparatus of claim 1, wherein the apparatus is further caused to:
    receive information on the upcoming content type change point in the call; and
    switch at the content type change point the active audio profile.

5. The apparatus of claim 1, wherein the apparatus is further caused to: associate at least the first audio profile with a first visualization mode and the second audio profile with a second visualization mode, wherein the first visualization mode and the second visualization mode are visualization modes of the audio-visual conferencing service; use a visualization mode associated with the active audio profile; and switch the visualization mode when the active audio profile is switched.

6. The apparatus of claim 5, wherein the apparatus is further caused to: receive a user input selecting a visualization mode; and use the visualization mode selected regardless of a visualization mode associated with the active audio profile.

7. The apparatus of claim 1, wherein the apparatus is further caused to:
    associate at least the first audio profile with a first visualization mode and the second audio profile with a second visualization mode, wherein the first visualization mode and the second visualization mode are visualization modes of the audio-visual conferencing service;
    prompt, when switching the active audio profile from an audio profile with which a visualization mode associated with the audio profile is used, a user of the apparatus to provide a permission to switch the visualization mode; and
    switch, in response to a user input providing the permission, the visualization mode.

8. The apparatus of claim 1, wherein the apparatus is further caused to: switch, in response to receiving in the call one of a user input to change the active audio profile or a user input triggering the change, the active audio profile according to the user input.

9. The apparatus of claim 1, wherein the first audio profile is for bi-directional transmission of audio providing mono playback and the second audio profile for unidirectional audio providing stereo playback.

10. The apparatus of claim 9, wherein the apparatus is further caused to:
    in response to a receiving of a user input to mute the user when the first audio profile is the active audio profile, switch the active audio profile to be the second audio profile;
    in response to a receiving of a user input to unmute the user when the second audio profile is the active audio profile, switch the active audio profile to be the first audio profile while maintaining the user muted; and
    in response to a receiving of a user input to unmute the user when the first audio profile is the active audio profile, unmute the user.

11. The apparatus of claim 10, wherein the apparatus is further caused to: indicate a status of the user to be deep muted when the active audio profile is the second audio profile, muted when the active audio profile is the first audio profile and the user is muted, or unmuted when the active audio profile is the first audio profile and the user is unmuted; and
    transmit to other participants of the call the status of the user.

12. The apparatus of claim 1, wherein the apparatus is further caused to:
    use, for transmission of audio to other participants in the call, one of a first microphone in the audio playback device and at least one second microphone the apparatus comprises or is connected to;
    determine at least the first audio profile for transmitting audio of the first quality for the playback with the use of the first microphone and determine the second audio profile for at least transmitting audio of the second quality for playback with the use of the at least one second microphone;
    switch, in response to starting to use the first microphone, the active audio profile to be the first audio profile; and
    switch, in response to starting to use one of the at least one second microphone, the active audio profile to be the second audio profile.

13. The apparatus of claim 12, wherein the apparatus is further caused to determine, while a user is talking, whether to use the first microphone or the one of the at least one second microphone based on at least one of a distance between the apparatus and the audio playback device, or signal strength difference between the microphones; and in response to the determining switch to use the first microphone, perform switching of the active audio profile, and when the active audio profile switching is completed, switch to the first microphone.

14. A method comprising:
maintaining, for an audio-visual conferencing service, at least two audio profiles for one or more audio playback devices, the at least two audio profiles comprising a first audio profile for at least transmitting audio of a first quality for playback and a second audio profile for at least transmitting audio of a second quality for playback;
receive information on an upcoming content type in a call;
based on a content type associated with an active audio profile of the at least two audio profiles being different than an upcoming content type, enabling changing of the active audio profile during the call established using the audio-visual conferencing service switching the active audio profile between at least the first audio profile and the second audio profile; and
delivering received audio in the call to an audio playback device according to the active audio profile.

15. The method of claim 14, wherein the first audio profile is associated with the first content type and the second audio profile is associated with a second content type and wherein the method further comprising: determining a content type of received content in the call; and switching the active audio profile, upon detecting that the content type in the call is not associated with the active audio profile.

16. The method of claim 14, wherein the first audio profile is associated with the first content type and the second audio profile is associated with a second content type and wherein the method further comprising:
defining, using the information, a switch point in the call for changing the active audio profile to be an audio profile associated with the upcoming content type; and
switching at the switch point the active audio profile.

17. The method of claim 14, wherein the method further comprising:
receiving information on the upcoming content type change point in the call; and
switching at the content type change point the active audio profile.

18. The method of claim 14, wherein the method further comprising: associating at least the first audio profile with a first visualization mode and the second audio profile with a second visualization mode, wherein the first visualization mode and the second visualization mode are visualization modes of the audio-visual conferencing service; using a visualization mode associated with the active audio profile; and switching the visualization mode when the active audio profile is switched.

19. The method of claim 14, wherein the method further comprising:
associating at least the first audio profile with a first visualization mode and the second audio profile with a second visualization mode, wherein the first visualization mode and the second visualization mode are visualization modes of the audio-visual conferencing service;
prompting, when switching the active audio profile from an audio profile with which a visualization mode associated with the audio profile is used, a user of the apparatus to provide a permission to switch the visualization mode; and
switching, in response to a user input providing the permission, the visualization mode.

20. A non-transitory computer readable medium comprising program instructions stored thereon for performing at least:
maintaining, for an audio-visual conferencing service, at least two audio profiles for one or more audio playback devices connectable to the apparatus, the at least two audio profiles comprising a first audio profile for at least transmitting audio of a first quality for playback and a second audio profile for at least transmitting audio of a second quality for playback;
receiving information on an upcoming content type in a call;
based on a content type associated with an active audio profile of the at least two audio profiles being different than an upcoming content type, enabling changing of an active audio profile during the call established using the audio-visual conferencing service comprising switching the active audio profile between at least the first audio profile and the second audio profile; and
delivering received audio in the call to an audio playback device connected to the apparatus according to the active audio profile.

* * * * *